June 22, 1965  G. H. MORRIS  3,190,363
TRIPLE SECTION ROTARY ROD WEEDER
Filed Feb. 26, 1964  8 Sheets-Sheet 2

June 22, 1965  G. H. MORRIS  3,190,363
TRIPLE SECTION ROTARY ROD WEEDER
Filed Feb. 26, 1964  8 Sheets-Sheet 4

June 22, 1965   G. H. MORRIS   3,190,363
TRIPLE SECTION ROTARY ROD WEEDER
Filed Feb. 26, 1964   8 Sheets-Sheet 7

United States Patent Office 3,190,363
Patented June 22, 1965

3,190,363
TRIPLE SECTION ROTARY ROD WEEDER
George Henry Morris, 37 6th Ave. N., Yorkton,
Saskatchewan, Canada
Filed Feb. 26, 1964, Ser. No. 347,485
4 Claims. (Cl. 172—44)

This invention relates to rotary rod weeders and has reference to a weeder of this character embodying two or more sections.

In the art to which the invention relates rotary rod weeders more usually consist of a single section, and it has been proposed to increase the working capacity of such a weeder by forming the weeder of two or more sections connected in line abreast for working, or in tandem for travel.

The present invention is directed primarily to a three section rotary rod weeder, embodying therein means by which a center and two wing sections may be connected rearwardly for movement in relation to each other between working positions in line abreast and positions in tandem for travel, and including forward connecting elements for securing the sections together in working position, and rearward connecting elements for attaching the rear outer ends of the wing sections each to the next succeeding section ahead in line for travel of the machine.

In cultivating on farms of large acreage a greatly increased width of implement is needed, but such an implement must be capable of having its sections moved into a compact formation for travel between farms or farm areas, along the roads and across narrow bridges.

The present implement is designed to have an overall working width of thirty-six feet, and is capable of cultivating fifteen to twenty acres an hour. The wing sections may be adjusted for travel very quickly.

The device as herein disclosed includes improved draft connections for the wing sections, permitting easy adjustment of the sections between working and travel positions, also improved pivotal connections between the sections by which a series of independent wheel supported sections may be connected in working position with the sections free to pivot in relation to each other in following the contours of the land. There is also provided improved means for mounting the sections on the supporting wheels by which they may be moved as a unit, tilted downward, and secured with the ground working elements raised for travel, and including improved driving means for the rotary rods, the rod for each section being driven independently, each from a ground wheel. This movement of the sections requires only a single hydraulic element operated from the tractor by which the implement is drawn.

Other features and advantages of the invention will become apparent by reference to the accompanying description taken in conjunction with the drawings.

In the drawings, wherein is illustrated a preferred embodiment of the invention.

Having reference to the drawings, the rotary rod weeder as herein disclosed is made up of three separate sections, all independently wheel supported and each employing a single bar type frame. Since all three units are basically the same, parts in the units will be designated by the same reference characters in all three units where such are common to all units.

Each unit includes a tubular frame bar 1, square in cross section. These frame bars are each supported by wheels 2 mounted rotatable on stub axles 3 fixed in arms 4 that pivotally attach by split bearing elements 5 (FIGS. 7 and 8) to gang shafts 6 mounted in end plates 7 attached by bolts 8 to lugs 9 on the ends of the tubular frame bars 1, the end plates projecting rearwardly of the frame bars, additional plates, inwardly located, for support of the gang shaft being added as required.

On the frame bars 1 are mounted tubular depth control bars 10 free to turn in brackets 11 (FIGS. 7 and 8) fixed to the frame bar, and to the depth control bar 10 of the center section is fixed an arm 12 (FIG. 13) projecting upwardly therefrom. To the arm 12 is operatively connected a hydraulic element 13 (FIGS. 3 and 13) that is anchored to a plate 14 fixed to the center section frame bar 1 rearwardly projecting, the hydraulic element receiving fluid under pressure from the tractor, as by tubes 15, it being understood the implement would be tractor drawn.

Figure 7:
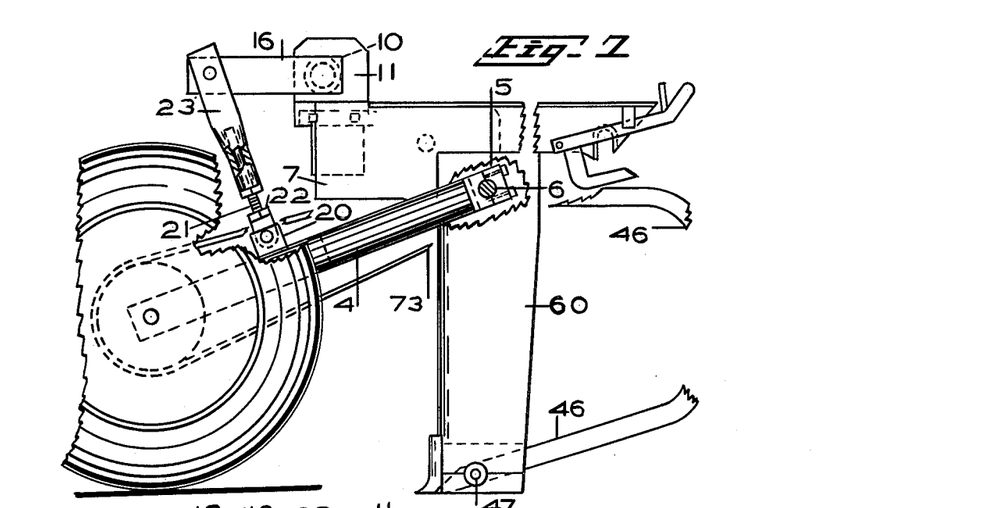
FIG. 7 is an enlarged side view, broken away in parts, showing the mounting for a wheel with adjustable link bar, and including a leg and fragments of a shank.
Figures 8, 9, 10:
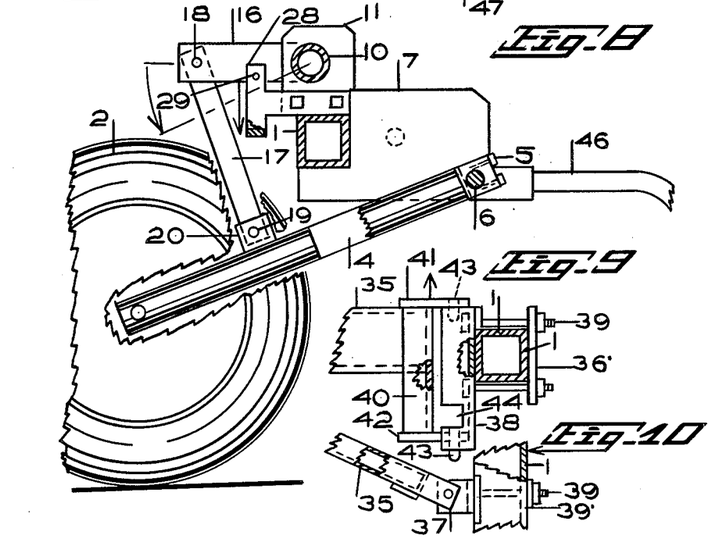
FIG. 8 is an enlarged side view, broken away in parts and partly in section, showing a fixed link connection for a wheel, and including the plate for locking the section elevated as it would be in position for travel.
FIGS. 9 and 10 are detailed enlarged side and top views indicated relative to FIGURE 2 by the lines 9—10, showing attachment of a wing section draft bar to the section frame bar, with parts broken away and in section.

For raising and lowering the frame bars 1 on the wheel axles 3 arms 16 (FIG. 8) are fixed to the control bars 10 extending forwardly, and to these arms pivotally attach links 17 by pins 18, the links pivotally attaching by pins 19 to lugs 20 fixed on the wheel mounting arms 4. These connecting links 17 may be nonadjustable, as shown in FIGURE 8, or adjustable, as shown in FIGURE 7, such an adjustable link having a rod 21 threaded in the end 22 of a link 23, and pivoted to the arm lug 20.

Figure 5:
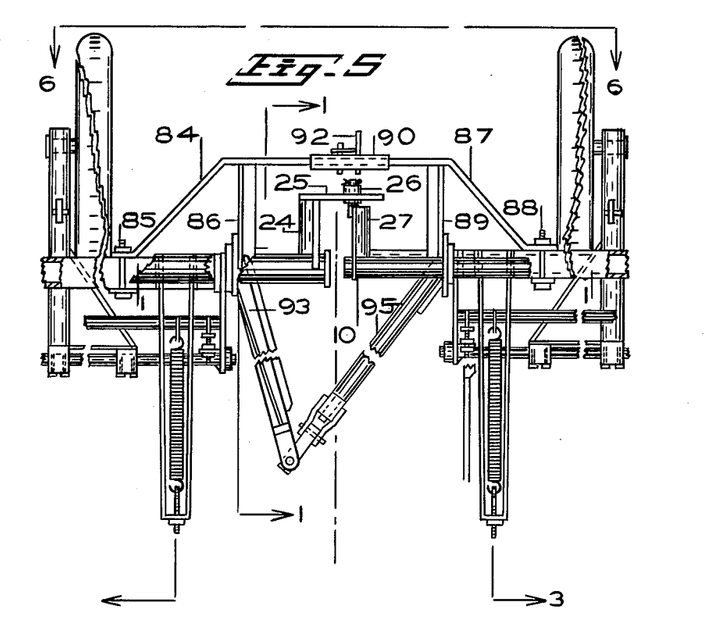
FIG. 5 is an enlarged top plan view of the connected portions of the center and right sections, shown in relation to FIGURE 3 by the lines 5—5, thereof, and in parts as broken away.
Figure 6:
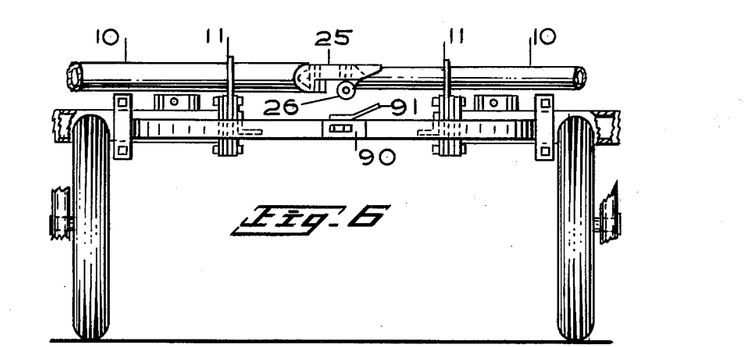
FIG. 6 is an enlarged front view taken on a line 6—6 of FIGURE 5, shown as including the adjoining wheels of the section, but with other parts, including the wheel bearing arms, broken away.
Figure 11:
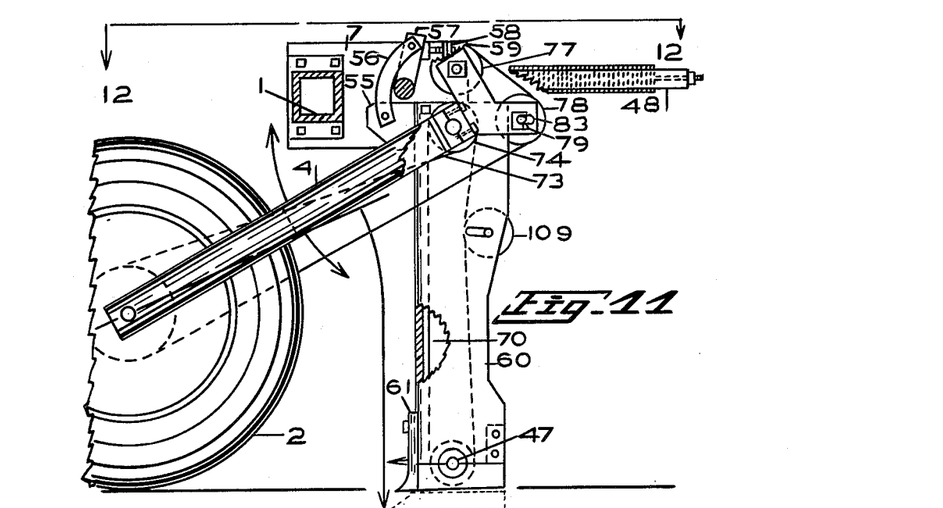
FIG. 11 is an enlarged side view, taken on a line 11—11 of FIGURE 1, showing a wheel and mounting for the wheel on a frame cross bar, and including a leg and the driving connections for a rotary rod, a fragment of a spring and spring mounting for the rocker shaft being included, parts being shown broken away and parts in section.

To raise or lower the frame bar 1 of the center section on the supporting wheels of the section the hydraulic element 13 is used to turn the tubular control bar 10 for the section. It is also necessary to raise and lower the two end sections at the same time, for which arms 24 (FIG. 5) are fixed to the ends of the control bars 10 of the center section, and these arms 24 have outwardly extending arms 25 (FIGS. 5–6) that engage rollers 26, the rollers mounting on arms 27 fixed to the control bars 10 of the outer sections, so that when the implement is in working position, as in FIGURE 3, turning the control bar 10 of the center section by the hydraulic element, as indicated by the arrows in FIGURE 8, to raise the working elements of the implement by rotating the control bar 10 on the section, correspondingly turns the control bars 10 of the outer sections through the arms 25 and rollers 26, and all the sections are raised as a unit by forcing the wheels 2 down in relation to the frame 1, as in FIGURE 11, with the bearings 5 (FIGS. 7 and 8) pivoting on the shaft 6.

When in raised position the sections may be secured by locking plates 28 (FIG. 8) by placing a pin through the hole 29 and above the arm 16.

The draft connection for the machine includes a clevis 30 (FIGS. 3 and 4) for attachment to a tractor by which the implement is drawn, and to the clevis transversely attaches a draft connecting plate 31 to which are attached center section draw bars 32 by a bolt 33. These draw bars 32 attach to the center section beam 1 (FIG. 13) by bolts at 34.

Figures 3, 4:
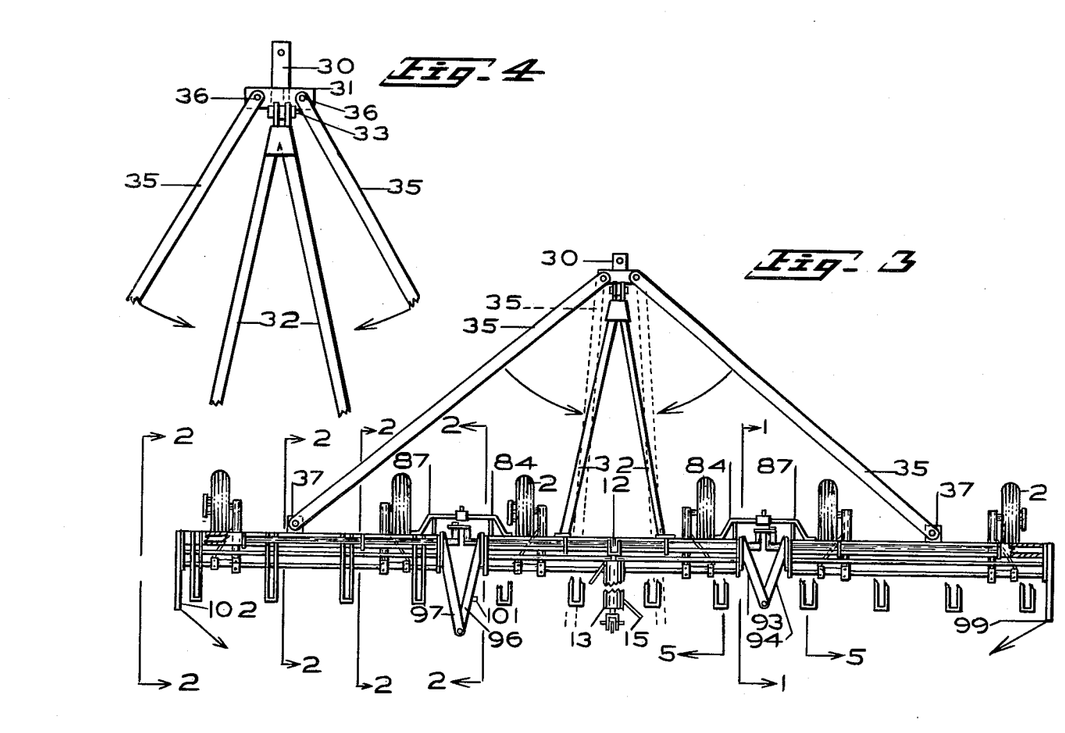
FIG. 3 is a top plan view on a reduced scale showing the sections connected in line abreast for working, with parts omitted for convenience of illustration, and indicating by dashed lines the positions of the wing section draft bars when moved into position for travel of the implement, and with the relation to corresponding parts in FIGURE 2 indicated by lines 3—3.
FIG. 4 is a detailed, enlarged top view showing a forward fragment of the draft bar assembly, with the wing section draft bars moved inward.

For travel of the wing sections in working position, as in FIGURE 3, with the sections in line abreast, wing section draft bars 35 (FIGS. 3 and 4) attach pivoted by pins 36 to the draft plate 31, and by brackets 37 to the wing section frame bars 1. The brackets 37 comprise box casings 38 (shown in detail in FIGURES 9 and 10) that are attached to the frame bars 1 of the wing sections by bolts 39 and plates 39'. On the draft bars 35 are brackets 40 with upper and lower end projections 41 and 42 having depending pins 43 that engage suitable openings in the top and bottom of the casings 38, this engagement being effected by bringing the draft bars into horizontal line with the casings 38 but raised the length of the pins, and then moving the draft bars sidewise to align the pins with the openings in the tops and bottoms of the casings, the casings having openings, as at 44, through which the lower projections 42 and pins 43 pass sidewise in effecting alignment of the pins with the openings.

Figure 13:
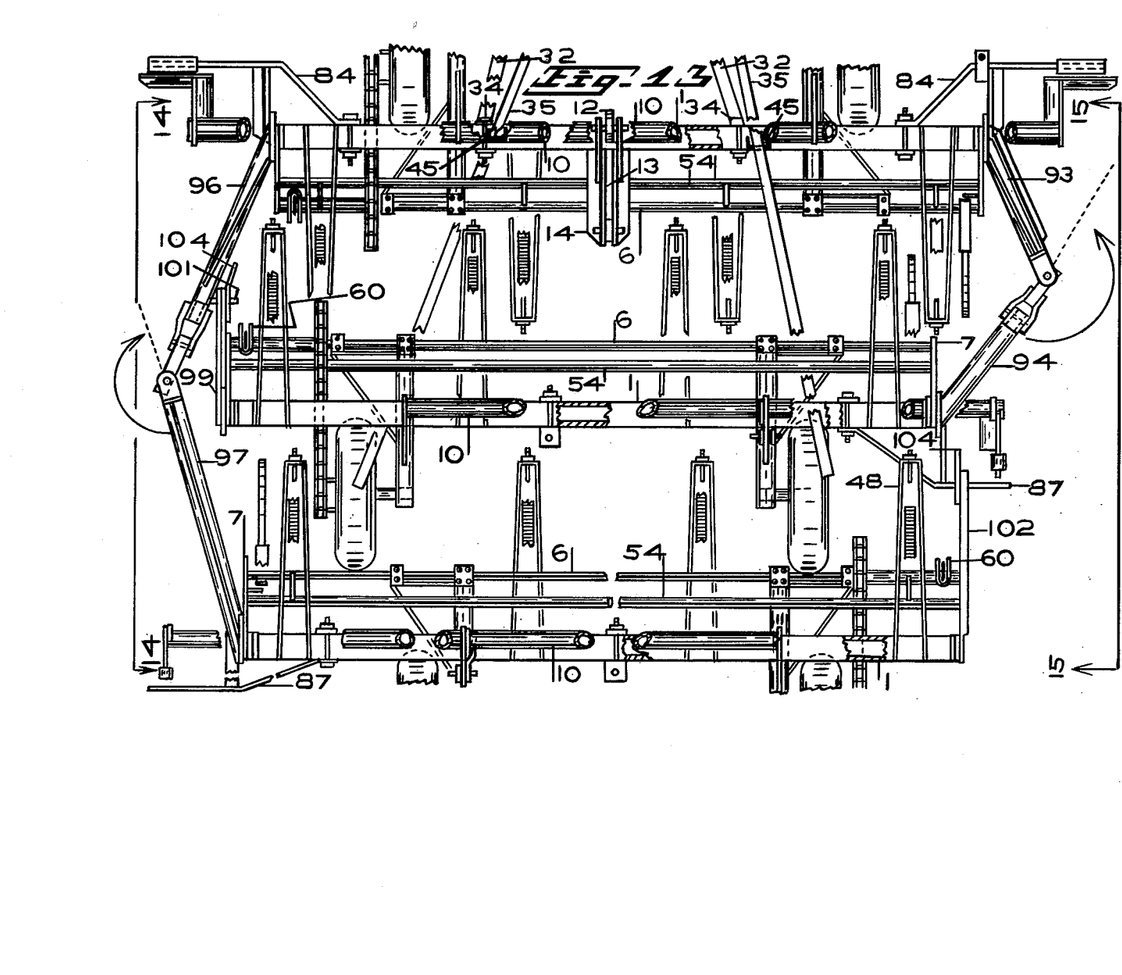
FIG. 13 is a top plan view showing the implement, with the wing sections reversed and connected in line behind the center section for travel of the implement, with parts shown broken away.
Figure 14:
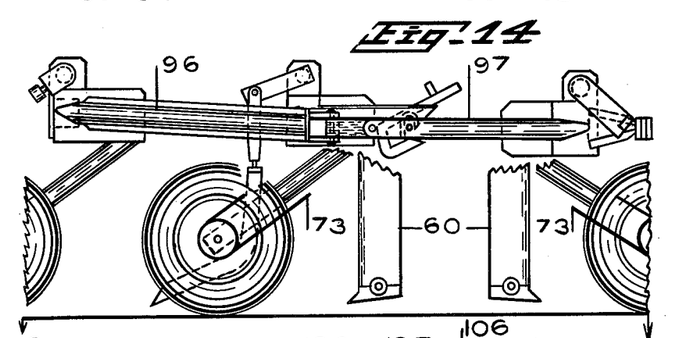
FIG. 14 is a side view of the implement taken on a line 14—14 of FIGURE 13.

For moving the wing sections into position in following relation to the center section, as in FIGURE 13, for travel of the implement, the draft bars 35 are disengaged from the frame bars 1 and moved inward where they are set in brackets at 45 (FIG. 13) on the center section frame bar 1.

Figures 15, 16, 17:
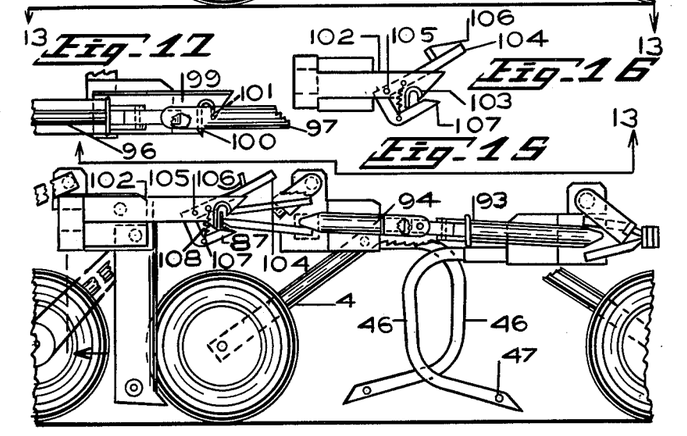
FIG. 15 is a side view of the implement taken on a line 15—15 of FIGURE 13.
FIG. 16 is an enlarged side view showing the connected bars for the center and left sections with the locking bar catch engaged therewith.
FIG. 17 is an enlarged side view showing the locking bar catch taken by itself.

On the gang shafts 6 (FIGS. 1–2) are attached a series of shanks, as at 46 (FIG. 15) carrying weeder rods 47, each section having its own separate rod. These shanks are fixed to the gang shaft, with the shanks of each section moving as a unit when an obstruction is encountered by the weeder rod.

Figure 12:
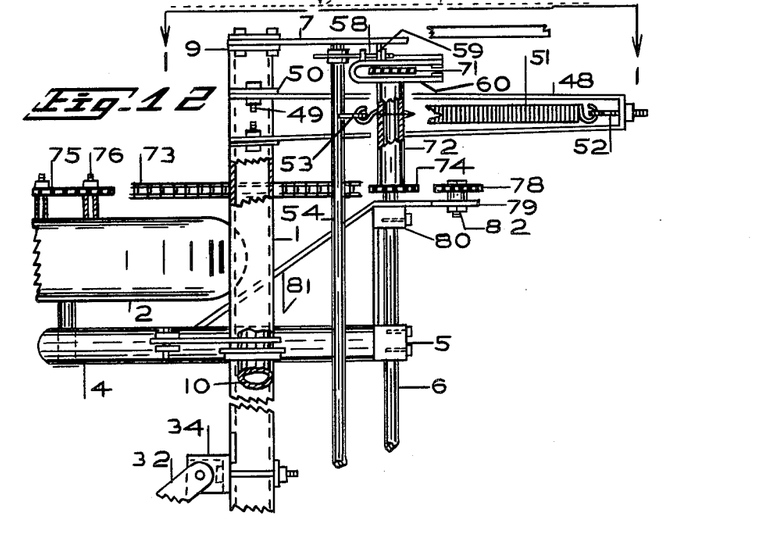
FIG. 12 is a top plan view taken on a line 12—12 of FIGURE 11, the line 1—1 indicating its relation to FIGURE 1.

For cushioning the shanks, brackets 48 (FIGS. 11, 12 and 13) are attached by bolts 49 to lugs 50 on the frame bars 1 of the sections. Extension springs 51 (FIG. 12) are anchored rearwardly to the brackets 48 by eye bolts 52 and forwardly engage arms 53 on rocker shafts 54 which are pivotally supported in the end plates 7 on the frame bars 1.

The shanks 46 and legs 60 (FIG. 11) include arms 55 that are attached to and extend forwardly of the gang shaft 6 and pivotally attach by links 56 (FIG. 11) to arms 57 fixed on the rocker shafts 54, these arms having their forward movement adjustably limited by bolts 58 (FIGS. 11–12) threaded in lugs 59 on the end plates 7.

Figures 18, 19, 20:
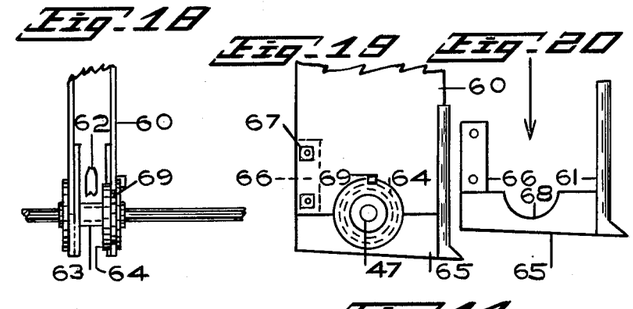
FIG. 18 is a rear view showing a fragment of a leg and rotary rod, and including the driving connection for the rod.
FIG. 19 is a side view of the lower part of a leg showing the mounting of the rotary rod bearing.
FIG. 20 shows a side view of the removable shoe for the leg which supports the rotary rod bearing.

As will be seen by reference to FIGURE 13 the weeder leg drive connections are on the outer ends of each of the wing sections, or they can be placed on the inner ends of the outer sections and the left end of the center section. The drive connections to the rods are protected by the drive legs 60 (FIGS. 11 and 12) fixed on the gang shafts 6, these legs carrying points 61. Mounted in the legs 60 are leg sprockets 62 on hubs 63 rotatable in bearings 64 (FIGS. 18, 19 and 20). The shoes on the lower ends of the legs 60 have attached thereto bearing plates 65 that carry the points 61. The rear of each shoe is attached to its leg by a plate 66 with bolts 67. The bearing plates 65 and the leg body to which each shoe attaches provide half circle openings 68 for the bearings, the bearings being fixed against turning by studs 69 engaging suitable openings in the leg body. By this means the bearings are removable for replacement.

On the leg sprockets 62 are engaged chains 70 that are driven by sprockets 71 (FIGS. 11, 12 and 18) on drive sleeves 72 mounted free to turn axially on the gang shafts 6 in the legs 60. The sleeves are driven by sprockets at 74 (FIG. 12) and by sprockets 75 attached by bolts 76 to the hubs of the ground wheels 2. For driving the rotary rods oppositely to the travel of the ground wheels the chains 73 on sprockets 75 engage the sprockets 74 on the under side and are carried over idler sprockets 77 and tightener idler sprockets 78 that are mounted on a bracket plate 79 fixed on a bearing 80 that is carried by a brace bar 81 fixed to the wheel supporting arm 4. The sprocket 78 mounts on a bolt 82 that engages a slotted opening 83 (FIG. 11) in the plate 79. This arrangement is repeated for each rotary rod drive, and permits the ground wheels to swing upward and rearward without affecting the tension of the chains 73.

While a single drive assembly is shown for each section both wheels for the sections could be provided with drive assemblies, and this would include a leg for each assembly with the rotary rods 47 divided to provide a rod for each assembly.

The wing sections of the implement are attached forwardly to the center section (FIGS. 5 and 13) by attached arms 84, one to each end, attached by bolts 85 to the center section frame bar 1 and braced by bars 86. On the wing sections are bracket arms 87 attached to the front of the wing sections on the frame bars 1 by bolts 88 and braced at 89. On the bracket arms 84 are channel locking brackets 90 (FIGS. 5 and 6) with guide plates 91. The bracket arms 87 of the wing sections slide into the channel bracket 90 and are secured by locking pins 92.

Rearwardly the wing sections pivotally attach to the center section so that they may be moved into reversed following relation to the center section.

On the right end of the center section (FIGS. 1 and 13) is attached a pivot arm 93 to the end plate by the bolts 8, the arm extending rearward and inclined outwardly, and to the right wing section an arm 94 is attached by the bolts 8 to the section end plate 7, the arm extending rearwardly outward. These arms 93 and 94 are pivotally connected by a universal coupling 95 to pivot vertically and horizontally.

On the left end of the center section is attached a pivot arm 96 (FIG. 2) by the end plate bolts 8, the arm extending rearwardly outward, and on the left wing section an arm 97 is attached by the end plate bolts 8 extending rearwardly outward. The arms 96 and 97 are connected by a universal coupling 98 to pivot vertically and horizontally. These arms 96 and 97 are of greater length than the arms 93 and 94, as will be seen by reference to FIGURE 13, to allow the left section to be moved into position behind the right section.

For travel of the machine the wing sections are moved into reverse following relation to the center section, one behind the other, as in FIGURE 13. To connect the wing sections in this position the right wing section has a locking arm 99 (FIGS. 17 and 13) attached fixed to the outer end of the wing section frame bar 1, this arm having a jaw 100 (FIG. 17) engageable with a pin 101 on the pivot arm 96 (FIG. 13). Similarly the left wing section has a locking arm 102 attached to the outer end of the frame bar 1, this arm having a jaw 103 (FIG. 16) engageable with the bracket arm 87 on the right wing section (FIG. 13).

Both the locking arms 99 and 102 have pivoted thereto a locking lever 104 (FIG. 16) by a pin 105, the lever having a stud 106 on its upper side by which it may be engaged by a length of iron pipe to give greater leverage in disengaging the arm, and an angle arm 107 on its under side, with a spring 108 (FIG. 15) holding the locking arm engaged.

In the use of the implement, the weeder wing sections are aligned with the center section, as in FIGURE 3, for working the soil. For this the sections are forwardly connected by the bracket arms 84 and 87, as shown in FIGURES 1, 2 and 3, on the center and wing sections that connect by the pins 92.

Figure 1:
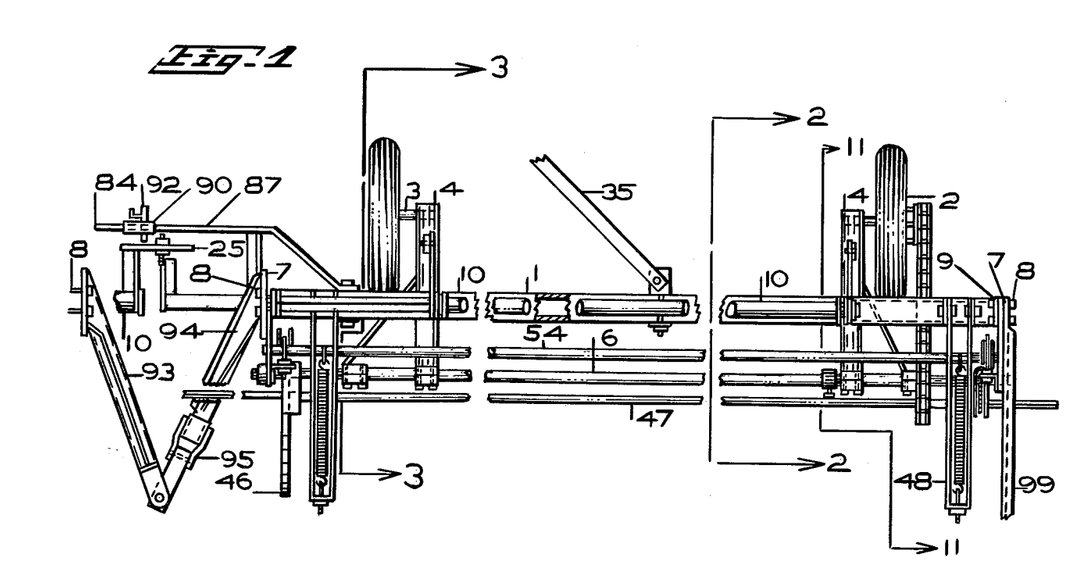
FIG. 1 is a top plan view of the right wing section from the line 1—1 of FIGURE 3 to the right end of the section, shown with its attachment to the center section cut along the lines 1—1 of FIGURE 3 and FIGURE 5, a fragment only of the center section being included, parts being shown broken away and the frame cross bar partly in horizontal section, parts being omitted for convenience of illustration.
Figure 2:
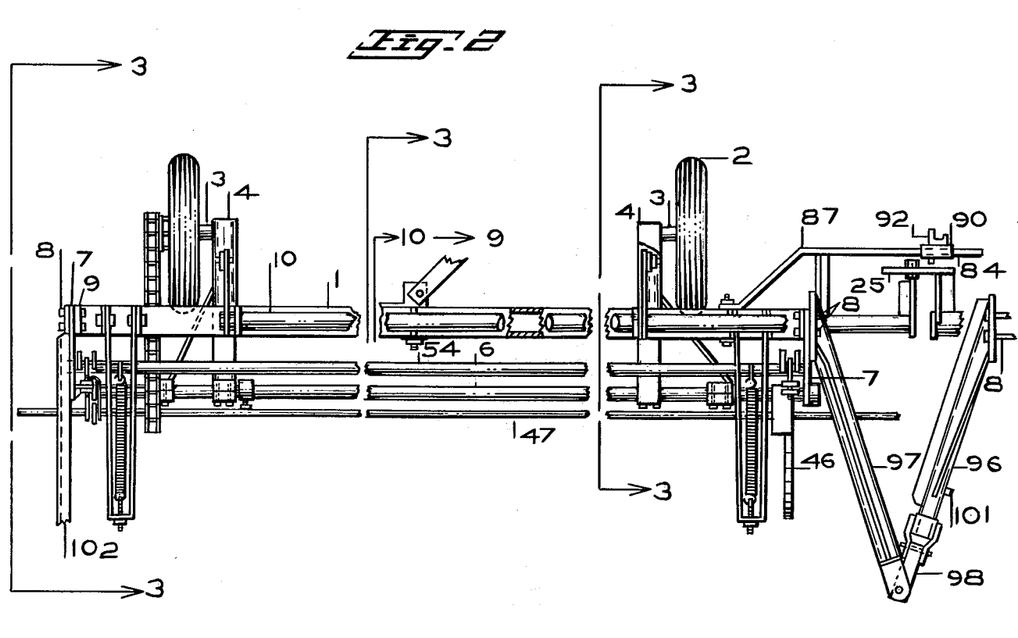
FIG. 2 is a top plan view of the left section cut along the line 2—2 of FIGURE 3 looking to the left end of the section, similar to the showing in FIGURE 1, and including rear pivotal connecting bars for the sections of greater length than the bars for connection of the right section, and with the relation of corresponding parts in FIGURE 3 indicated by lines 2—2.

Rearwardly, as shown in FIGURES 1, 2 and 3, the center and right sections connect by the coupling bars 93 and 94, and the center and left sections by the coupling bars 96 and 97.

The sections are shown connected in line abreast for work in FIGURE 3, and in tandem for travel in FIGURE 13.

In the position for travel the right section is in line directly behind the center section, and the left section is behind the right section. When in line for work the implement is drawn by the draw bars 32 and the disconnectable draft bars 35.

To change the implement from a work position to a position for travel the sections must first be raised upwardly pivoting on the wheels to lift the shanks 46 and weeder rods 47 out of working relation with the ground, and when raised the pins 29 (FIG. 8) are used to connect the locking plates 28 and arms 16 for each section. In raising the center section the control bar 10 is turned forwardly, this pressing down on the arms 16 and by the links 17 (or 23) as evident by reference to FIGURES 7 and 8, the arms 25 on the center section control bar bear down against the rollers 26 (FIGS. 5 and 6) and this correspondingly turns the control bars 10 of the wing sections to raise these sections correspondingly to the movement of the center section.

With the sections raised the draft bar 35 of the right section is lifted at its rear end to disengage the pins 43 from the casing 38, and the draft bar is then placed in a bracket 45 on the center section, as in FIGURE 13. The pin 92 forwardly connecting the right and center sections (FIG. 1) is disengaged from the bracket arms 84 and 87, freeing the right section, and a brake (not shown) may be engaged on the outer wheel tire. The center section and attached left section is then swung to the left by the tractor, the movement being forward and short to the left, bringing the right section into position behind the center section. When in this position the locking bar 99 (FIG. 13) engages the pin 101 on the pivot bar 96 to secure the sections together.

The draft bar 35 for the left section is then raised and disengaged from the casing 38 on the left section and the draft bar placed on a bracket 45 of the center section. The pin 92 connecting the bracket arms 84 and 87 (FIG. 2) that forwardly connects the center and left sections is then removed and the center and right sections are turned forward and swung short to the right, bringing the left section into position behind the right section, when the locking bar 102 engages the bracket arm 87 of the right section, as shown in FIGURE 13.

For disengagement of the locking bars to move the wing sections back into line for work, as in FIGURE 13, a length of pipe may be used for greater leverage engaging the studs 106 on the levers 104 of the left and right sections in turn and the procedure for moving the sections from working positions to positions for travel is reversed, and the sections are brought into line and the pins 92 engaged to secure the bracket arms 84 and 86 of each section succession together again.

For travel on short moves, where clearance permits it would be sufficient to move the right section into line behind the center section and have the left wing section travel abreast of the center section.

Regulation of the working depth of the weeder rods is done through the hydraulic element 13.

Each of the leg drives includes a chain tightener comprising a sprocket 109 mounted in the drive leg engaging the chain 70.

What I claim is:

1. In a rotary rod weeder having a center section mounted for travel on supporting wheels and wing sections outwardly wheel supported, the center section having arms fixed to the outer ends thereof and the wing sections having arms fixed to their inner ends for coupling the sections together by which the wing sections may be moved into reversed following relation to the center section for travel of the sections as a compact unit on their supporting wheels; means for attachment of the wing section arms to the center section arms for pivotal movement of the sections vertically and horizontally in relation to each other, locking bars fixed to the outer ends of the wing sections projecting rearwardly, said bars having jaws on their outer ends, means for detachable engagement of the locking bar jaw of one wing section with the coupling arm on the opposite side of the center section when said one wing section is moved into reversed following relation to the center section, and a bracket on the inner end of said one wing section with which the jaw on the locking bar of the other wing section is engageable when said other wing section is moved into reversed following relation to said one wing section.

2. In a rotary rod weeder as set out in claim 1 and in which each of the sections includes a single transverse frame bar, means forwardly connecting the sections together for travel in line abreast with the transverse frame bars of the wing sections aligned end to end with the transverse frame bar of the center section, said means comprising bracket arms fixed to the center section extending horizontally forward and outward, corresponding bracket arms fixed to the wing sections extending horizontally forward and inward, locking brackets having channels in which the outward portions of the center section bracket arms and the inward portions of the wing section bracket arms are engageable, means attaching the channeled locking brackets to the outward portions of the center section bracket arms, and pins engageable for attachment of the inward portions of the wing section bracket arms to the channeled brackets.

3. In a rotary rod weeder having a center section and a wing section at each end attached to the center section, said sections each having a single transverse frame bar, said frame bars aligning end to end when the sections are in line abreast, and including a control bar, and hydraulic means anchored in the center section and connected for turning the center section control bar means mounting the control bars on the section frame bars, said means comprising brackets fixed to the frame bars, said brackets having the control bars turnable axially therein; ground wheels for the weeder and means mounting the ground wheels in supporting relation to the sections, said means comprising a gang shaft for each weeder section on which rod carrying shanks are mounted, means mounting the gang shafts on the frame bars parallel with the control bars and with the rod carrying shanks rearwardly extending, arms pivotally attached to the gang shafts extending forwardly, axles fixed to said arms, said axles having the ground wheels rotatable thereon, radial arms fixed to the control bars aligned one with each wheel mounting arm, links pivotally connecting the radial and wheel mounting arms for raising and lowering the section frame bars by turning the control bars, means connecting the control bars to be turned as a unit, and means connecting the frame bars for travel of the sections in line abreast, said means comprising a draft bar fixed to each end portion of the center section frame bar, a draft bar fixed to the inner end portion of each wing section frame bar, a draft plate fixed to the center section draft arms, and means connecting the wing section draft arms to the to the draft plate with the wing section frame bars held thereby in fixed alignment with the center section frame bar.

4. A rotary rod weeder as set out in claim 3 in which the means for connecting the control bars of the wing sections to the center section control bar include an arm rigidly fixed to each end of the center section control bar extending forwardly, a corresponding arm rigidly fixed to the inner end of each of the wing section control bars, an arm fixed on each of the center section control bar forwardly extending arms projecting laterally outward, and a roller mounted on the forwardly extending arms of the wing section control bars on which said laterally projecting arm bears to correspondingly turn the wing section control bars when the center section control bar is turned by the hydraulic element to raise the center section on its supporting wheels.

References Cited by the Examiner

UNITED STATES PATENTS

| | | | |
|---|---|---|---|
| 1,784,362 | 12/30 | Largent | 172—310 X |
| 2,052,302 | 8/36 | Johnson et al. | 172—568 |
| 2,547,479 | 4/51 | Markel | 172—581 |
| 2,621,459 | 12/52 | Scott | 172—581 X |
| 2,767,631 | 10/56 | Mowbray | 172—44 |
| 2,778,290 | 1/57 | Greeson et al. | 172—316 |
| 2,828,680 | 4/58 | Johnson | 172—456 |
| 2,901,268 | 8/59 | Christensen | 172—456 X |
| 2,978,042 | 4/61 | Jones | 172—456 |

FOREIGN PATENTS 670,865  9/63  Canada.

ABRAHAM G. STONE, *Primary Examiner.*

T. GRAHAM CRAVER, *Examiner.*